Patented July 7, 1953

UNITED STATES PATENT OFFICE 2,644,826

DI-NITROGEN CONTAINING DI-CARBOXYLIC ACIDS

John D. Spivack, Bayonne, N. J., assignor to Tide Water Associated Oil Company, Bayonne, N. J., a corporation of Delaware No Drawing. Application June 15, 1951,
Serial No. 231,891

15 Claims. (Cl. 260—404.5)

The present invention relates to novel chemical compounds and a method for preparation thereof.

The novel compounds embodied herein are di-nitrogen containing dicarboxylic acids that are dimer products and may be defined as di(N-carboxyalkyl alkanamides). As described more fully hereinafter, such compounds may be prepared by subjecting a (N-alkanoyl)iminodialkanoylnitrile to basic hydrolysis in the presence of a suitable hydroxylic liquid. (N-alkanoyl)-iminodialkanoylnitriles contemplated for use in preparation of the novel products by the aforesaid reaction include such nitriles in which the alkanoyl radical in the (N-alkanoyl) grouping may vary over a wide range of carbon atom content. As used herein, the term alkanoyl is intended to include the acyl residue of fatty acids both of the saturated and unsaturated type. For purposes of illustration and not limitation, (N-alkanoyl)iminodialkanoylnitriles are contemplated that contain, as the alkanoyl radical in the (N-alkanoyl) grouping, alkanoyl residues of long chain fatty acids, e. g. about six to about thirty carbon atoms, such as the residue of stearic acid, oleic acid, behenic acid, caprylic acid, and the like. In more specific illustration, suitable nitriles for practice of this invention include the (N-alkanoyl)iminodipropionitriles, examples of which are (N-stearoyl)iminodipropionitrile, (N-lauroyl)iminodipropionitrile, (N-behenoyl)iminodipropionitrile, (N-capryloyl)iminodipropionitrile, and the like.

As aforesaid, the novel reaction products embodied herein may be prepared by subjecting a nitrile as aforedescribed to basic hydrolysis in the presence of a suitable hydroxylic liquid, the reaction being carried out under conditions that result in production of ammonia by conversion of the nitrile groupings of the nitrile to carboxylic acid groupings. By conducting the reaction under ammonia-producing conditions, formation of the desired dimer product occurs, and, generally speaking, increased yields of the desired product occur as the amount of ammonia produced increases per mole of nitrile reacted until an optimum yield of the desired product is obtained and continuance of the reaction results in increased yield of other hydrolysis products, such as fatty acids derived from the (N-alkanoyl) grouping of the nitrile, at the expense of the desired di-nitrogen containing dicarboxylic acid. Thus, when it is desired to produce the dimer product in optimum yield, the reaction is carried out until a maximum amount of ammonia is produced commensurate with minimum formation of such other hydrolyzed products. It should be understood, however, that since formation of the desired reaction product occurs by carrying out the reaction under ammonia-producing conditions, the invention contemplates carrying out the reaction until maximum yields of the desired product are obtained or, if desired, discontinuing the reaction being carried out under such conditions at stages thereof prior to the extent of maximum production of the dimer product.

The conditions employed for carrying out the reaction may be varied depending on the amount of conversion desired, the particular hydroxylic liquid employed, and the like. For example, the reaction mixture comprising the nitrile, base and hydroxylic liquid is preferably heated to expedite reaction with the temperature being maintained below that sufficient to decompose the nitrile and/or hydroxylic liquid. In most instances, the reaction is suitably and expeditiously carried out by heating the reaction mixture at the reflux temperature of the hydroxylic liquid employed.

Hydroxylic liquids contemplated for use in the preparation of the desired reaction products include organic hydroxylic liquids, water, and the like. In preferred though not limitative aspect, hydroxylic liquids are employed that are solvents for the nitrile undergoing reaction, or for the desired reaction product, or both. Inclusive of liquids contemplated for use in the aforedescribed reaction are alcohols, such as the monohydric alcohols and glycols, illustrated by ethanol, propanol, ethylene glycol, and the like. Although, as more fully set forth hereinafter, water may be used as the hydroxylic liquid, use of organic liquids such as alcohols are preferred as, generally speaking, the latter enables the reaction to proceed more expeditiously and in more easily controllable manner and, in some instances, enable production of the desired reaction product in increased yields. With reference to the basic hydrolysis reaction, use is contemplated of basic substances capable of effecting base hydrolysis reactions, such basic substances including organic and inorganic substances. Basic compounds of the alkali and alkaline earth metals are highly suitable basic compounds for such usage, specific examples thereof being the hydroxides of sodium and potassium.

In order to further describe the invention, the following example illustrates a method suitable for preparation of the novel reaction products embodied herein. For purposes of illustration and not limitation, (N-alkanoyl)iminodipropionitriles have been employed for conversion thereof to the reaction products embodied herein. For purposes of completeness, the example also includes preparation for the (N-alkanoyl)iminodipropionitrile itself subjected, in accordance with this invention, to basic hydrolysis in the presence of a hydroxylic liquid for preparation of the di-nitrogen-containing di-carboxylic acid product of the particular (N-alkanoyl)iminodipropionitrile employed.

Preparation of (N-alkanoyl)iminodipropionitriles (A) Fifty-six grams (0.2 mole) of stearic acid were dissolved in 500 ml. of benzene by warming the mixture in a one liter three-neck flask fitted with a moisture protected reflux condenser, a dropping funnel, and a mercury seal stirrer.

Twenty-five grams (0.21 mole) of thionyl chloride were added dropwise through the dropping funnel over a period of 30–40 minutes while the mixture was continually stirred. The reaction mixture was then heated at reflux temperature and blown with dry nitrogen to remove gaseous non-condensible reaction products. Heating at reflux was continued until $SO_2$ evolved failed to effect a color change from orange to green of 2 cc. of a 0.1% solution of potassium dichromate.

Twenty-five grams (0.20 mole) of iminodipropionitrile were then added to the reaction mixture through the moisture protected dropping funnel, followed by addition of 15 ml. of pyridine, and the resulting mixture was boiled at reflux for one hour. The reaction mixture was distilled at atmospheric pressure to remove the benzene, and the resulting viscous residue was poured, while still warm and fluid, into 250 cc. of water. An aqueous slurry formed that was filtered; the resulting filter cake was washed with 5% aqueous HCl solution, then with distilled water, and pressed dry. The dried material was dissolved in a liter of hot hexane, clarified with Nuchar carbon, allowed to crystallize and the crystals recrystallized from hexane. The crystallized material, produced in 80% yield, was substantially pure (N-stearoyl)iminodipropionitrile that, upon analysis, gave nitrogen content values of 10.91% and 11.00%, the theoretical nitrogen content for the pure product being 10.77%.

(B) By use of a procedure as set forth in (A), except that acids such as lauric and behenic were used instead of stearic, the (N-lauroyl) and (N-behenoyl) homologs of (N-stearoyl)iminodipropionitriles were prepared. Both of the homologs are white crystalline materials with the (N-lauroyl)iminodipropionitrile having a melting point of 70–71° C. and the (N-behenoyl)iminodipropionitrile having a melting point of 89° C.

Preparation of di(N-carboxyethylalkanamides) from (N-alkanoyl)iminodipropionitriles Nine grams (0.023 mole) of (N-stearoyl)iminodipropionitrile were introduced into each of three 300 ml. round-bottom flasks containing a potassium hydroxide solution of a hydroxylic liquid. In one flask, the liquid was ethylene glycol, in another n-propanol, and ethanol in the other. The concentration of alkali and hydroxylic liquid used in each case is shown in the table hereinafter set forth. Each of the flasks containing the nitrile, alkali and hydroxylic liquid was connected to a reflux condenser through an adapter providing for sweeping the inside of the flask with dry nitrogen, and the condenser connected to an absorber (standard aqueous $H_2SO_4$) to absorb liberated ammonia. The reaction mixture was maintained at reflux temperature of the hydroxylic liquid employed until substantially two moles of ammonia were absorbed for each mole of the nitrile reacted. Data pertaining to the reaction time, yield of the desired dimer product, and amount of ammonia evolved for the specific reactions shown are set forth in the tabulation shown hereinafter.

| Hydroxylic Liquid Employed | Grams of KOH | cc. of hydroxylic liquid | Millimoles of (N-stearoyl) iminodipropionitrile | Reaction Time at Reflux Temp. (in hrs.) | NH₃ Absorbed | | Percent Yield of Dimer Product |
|---|---|---|---|---|---|---|---|
| | | | | | Millimoles | Percent of 2 Moles of NH₃ per Mole of Nitrile Reacted | |
| Ethylene Glycol (B. P. 197° C.) | 5 | 200 | 25.6 | 1 | 43.9 | 85.7 | 41.4 |
| N-Propanol (B. P. 97° C.) | 15 | 150 | 23.1 | 1¾ | 42.9 | 92.8 | 84.6 |
| Ethanol (95–96%) (B. P. 76° C.) | 15 | 150 | 23.1 | 1½ | 42.0 | 91.0 | 68.3 |

In each of the examples, the refluxed product was a homogeneous solution containing the potassium salts of di(N-carboxyethylstearamide). The solution was poured into 400 cc. of water and the resulting solution acidified with hydrochloric acid which produced a white gelatinous precipitate that was filtered, air dried, and crystallized from acetone. The crystallized product had a melting point of 119–120° C., possessed two carboxylic groups evidenced by neutralization equivalent points of 708 and 352 upon determination thereof electrometrically in dimethyl formamide and possessed two nitrogen atoms per molecule. The nitrogen-containing dicarboxylic acid product, herein designated di(N-carboxyethylstearamide), had an empirical formula of $C_{42}H_{80}O_6N_2$, and carbon, hydrogen and nitrogen content as shown in the following tabulation which also includes corresponding theoretical values for the dimer derivative of (N-stearoyl)iminodipropionitrile.

| | Reaction Product | Theoretical Values for Dimer Derivative from (N-stearoyl) iminodipropionitrile |
|---|---|---|
| Carbon Content | 71.16%; 71.34% | 71.11%. |
| Hydrogen Content | 11.60%; 11.38% | 11.37%. |
| Nitrogen Content | 4.46%; 4.63% | 3.95%. |
| Neutralization Equivalent | 708 and 352 | 709.1 and 354.6. |

By use of a procedure as described hereinbefore using a solution of KOH in ethylene glycol in the reaction, the corresponding dimer derived from (N-behenoyl)iminodipropionitrile, and termed di(N-carboxyethylbehenamide), was prepared having a melting point of 125° C., and the dimer from the (N-lauroyl)-containing nitrile, termed di(N-carboxyethyl lauramide), having a melting point of 109–111° C.

As aforesaid, water may be used as the hydroxylic liquid in the preparation of the reaction products embodied herein. In illustration, and with reference to the aforedescribed procedure for preparation of di(N-carboxyethyl stearamide), use of water as the hydroxylic liquid in place of the alcohols gave a yield of 41.1% of the di(N-carboxyethyl stearamide), i. e., a yield similar to that obtained by use of ethylene glycol. However, and although use of water as the hydroxylic liquid is embodied herein, use of hydroxylic organic liquids are preferred as, in comparison with the results obtained with ethylene glycol, the use of water required a longer period (3-4 hours) to produce a comparable yield (41.1%) of the desired reaction product. Moreover, use of water is usually attendant with more sudden and rapid evolution of gases (e. g. ammonia) during the reaction after an initial period of slow gas evolution and has an increased tendency to froth and emulsify, thus requiring more control over the reaction than is required in use of organic liquids such as the glycols and monohydric aliphatic alcohols.

The novel dimer products embodied herein are useful as intermediates in organic synthesis of derivatives thereof and as additives for imparting rust-preventive characteristics to liquids that contact corrodible metals. For example, the reaction products embodied herein are useful rust-preventive additives for mineral oil compositions and, particularly, in turbine oils. In some instances, as in the case of certain highly refined solvent extracted paraffinic type oils, certain of the reaction products as embodied herein are insoluble or only slightly soluble therein and, hence, for preparation of rust-preventive compositions, solubilizing agents for the reaction products may be used. For such a purpose, amine compounds, illustrated by primary branched long chain alkylamines, may be used as the solubilizing agents whereby oil compositions may be prepared that have imparted thereto by the reaction product a degree of rust-preventive characteristics sufficient to pass the severe rusting test in the presence of synthetic sea water set forth in the ASTM turbine oil rusting test, D665-47T.

Although the present invention has been described in conjunction with certain preferred embodiments thereof, those skilled in the art will readily recognize that variations and modifications can be made. Such modifications and variations are to be considered to be within the purview of the specification and scope of the appended claims.

I claim:

1. Di(N-carboxyalkyl alkanamides) in which the alkanoyl radical of the alkanamide grouping is an alkanoyl residue of a long chain fatty acid.

2. Di(N-carboxyethyl alkanamides) in which the alkanoyl component of the alkanamide grouping is an alkanoyl residue of a long chain fatty acid.

3. Di(N-carboxyethyl alkanamides) in which the alkanoyl radical of the alkanamide grouping is an alkanoyl residue of a fatty acid of about 6 to about 30 carbon atoms.

4. Di(N-carboxyethylstearamide).

5. Di(N-carboxyethylbehenamide).

6. Di(N-carboxyethyllauramide).

7. A process for preparing a di(N-carboxyalkyl alkanamide) from a (N-alkanoyl)iminodialkanoylnitrile in which the alkanoyl radical in the (N-alkanoyl) group is an alkanoyl residue of a long chain fatty acid which comprises subjecting said nitrile to base hydrolysis in the presence of a hydroxylic liquid under ammonia-producing reaction conditions, said hydroxylic liquid being a member from the group consisting of water and alcohols.

8. A process, as defined in claim 7, wherein the nitrile is a (N-alkanoyl)iminodipropionitrile.

9. A process, as defined in claim 7, wherein the alkanoyl radical of the (N-alkanoyl) grouping is an alkanoyl residue of a long chain fatty acid of about 6 to about 30 carbon atoms.

10. A process, as defined in claim 7, wherein the hydroxylic liquid is an alcohol.

11. A process for preparing a product containing two nitrogen atoms and two carboxylic groups per molecule from a (N-alkanoyl)iminodialkanoylnitrile in which the alkanoyl radical in the (N-alkanoyl) group is an alkanoyl residue of a long chain fatty acid which comprises subjecting said nitrile to base hydrolysis with an alkali in the presence of an alcohol at a temperature sufficient to liberate ammonia.

12. A process, as defined in claim 11, wherein the nitrile is reacted in the presence of said alkali and alcohol at the reflux temperature for said alcohol.

13. A method for preparation of a compound containing two nitrogen atoms and two carboxylic groups per molecule from a (N-alkanoyl) iminodipropionitrile in which the alkanoyl radical in the (N-alkanoyl) group is an alkanoyl residue of a long chain fatty acid which comprises subjecting said nitrile to basic hydrolysis in the presence of an alkali metal hydroxide and an alcohol under ammonia-producing conditions to produce a reaction mixture comprising a compound containing two nitrogen atoms and two carboxylic groups per molecule in the form of an alkali metal salt thereof, and acidifying the reaction mixture to convert said salt to its corresponding free dicarboxylic acid.

14. A method, as defined in claim 13, wherein the nitrile is subjected to basic hydrolysis at the reflux temperature of the alcohol.

15. A method for preparation of a compound containing two nitrogen atoms and two carboxylic groups per molecule from a (N-alkanoyl)iminodipropionitrile in which the alkanoyl radical in the (N-alkanoyl) group is an alkanoyl residue of a fatty acid of about 6 to about 30 carbon atoms which comprises subjecting said nitrile to basic hydrolysis in presence of an alcohol under ammonia-producing conditions to produce a reaction mixture comprising a compound containing two nitrogen atoms and two carboxylic groups per molecule in the form of a salt thereof, and hydrolyzing the reaction mixture to convert said salt to its corresponding free dicarboxylic acid.

JOHN D. SPIVACK.

References Cited in the file of this patent

UNITED STATES PATENTS

| Number | Name | Date |
| --- | --- | --- |
| 2,047,069 | Hentrich et al. | July 7, 1936 |

OTHER REFERENCES

Degering: An Outline of Organic Chemistry (1941), page 150. (Published by Barnes & Noble, Inc., New York.)

Degering: An Outline of Organic Nitrogen Compounds (1945), page 538 (1711).

Ann. Chim. 20, 660-700 (1945), cited in 40, Chemical Abstracts, 4348.